United States Patent
Saeki et al.

(10) Patent No.: US 8,922,945 B2
(45) Date of Patent: *Dec. 30, 2014

(54) DISK DRIVE SPINDLE MOTOR WITH WIRING SUBSTRATE HAVING EXTENSION PORTION PASSING THROUGH OPENING IN BASE

(71) Applicant: Nidec Corporation, Kyoto (JP)

(72) Inventors: Shintaro Saeki, Kyoto (JP); Atsushi Yawata, Kyoto (JP); Yoichi Sekii, Kyoto (JP); Takehito Tamaoka, Kyoto (JP); Hiroyuki Abe, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/767,228

(22) Filed: Feb. 14, 2013

(65) Prior Publication Data

US 2013/0229727 A1    Sep. 5, 2013

Related U.S. Application Data

(60) Provisional application No. 61/605,314, filed on Mar. 1, 2012, provisional application No. 61/620,505, filed on Apr. 5, 2012.

(30) Foreign Application Priority Data

Nov. 13, 2012    (JP) ................................. 2012-249735

(51) Int. Cl.
*G11B 19/20*    (2006.01)
*H02K 5/22*    (2006.01)
*H02K 3/52*    (2006.01)

(52) U.S. Cl.
CPC ................ *H02K 5/225* (2013.01); *H02K 3/522* (2013.01); *H02K 2211/03* (2013.01)
USPC ......................... 360/99.08; 310/67 R; 310/90

(58) Field of Classification Search
CPC .... H02K 5/255; H02K 3/522; H02K 2211/03
USPC .......... 360/99.08, 98.07, 99.04; 310/90, 67 R
See application file for complete search history.

(56) References Cited

U.S. PATENT DOCUMENTS 7,012,191 B1    3/2006    Watanabe et al.
8,120,872 B2    2/2012    Sekii et al.
(Continued)

FOREIGN PATENT DOCUMENTS

JP    05-207717 A    8/1993
JP    05-070184 U    9/1993
(Continued)

OTHER PUBLICATIONS

Sekii et al., "Motor and Disk Drive Apparatus", U.S. Appl. No. 13/564,934, filed Aug. 2, 2012.

(Continued)

*Primary Examiner* — Craig A. Renner
(74) *Attorney, Agent, or Firm* — Keating & Bennett, LLP (57) ABSTRACT

A spindle motor includes a stationary unit, a rotary unit and a bearing mechanism. The stationary unit includes a base member, a stator including a plurality of coils and a wiring substrate electrically connected to the stator. The base member includes a tubular portion, a first accommodation portion, an opening portion, a plurality of coil accommodation portions, a second accommodation portion, and at least one through-hole. The wiring substrate includes an arc portion and an extension portion. A lead wire is led out from at least one of the coils and is connected to the arc portion by soldering within the through-hole.

30 Claims, 10 Drawing Sheets

(56) References Cited

U.S. PATENT DOCUMENTS

| | | | |
|---|---|---|---|
| 8,363,352 B2 | 1/2013 | Kang | |
| 8,693,138 B2* | 4/2014 | Saeki | 360/99.08 |
| 2006/0138886 A1 | 6/2006 | Ito et al. | |
| 2006/0265871 A1 | 11/2006 | Ito et al. | |
| 2007/0247010 A1 | 10/2007 | Ichizaki | |
| 2007/0278880 A1 | 12/2007 | Wada et al. | |
| 2008/0019038 A1 | 1/2008 | Xu et al. | |
| 2008/0084142 A1 | 4/2008 | Ino et al. | |
| 2010/0177627 A1 | 7/2010 | Ino et al. | |
| 2012/0200957 A1 | 8/2012 | Yawata | |
| 2013/0049551 A1* | 2/2013 | Tamaoka et al. | 310/67 R |
| 2013/0050872 A1* | 2/2013 | Sekii et al. | 360/99.08 |

FOREIGN PATENT DOCUMENTS

| | | |
|---|---|---|
| JP | 05-316704 A | 11/1993 |
| JP | 06-343242 A | 12/1994 |
| JP | 08-033253 A | 2/1996 |
| JP | 08-237899 A | 9/1996 |
| JP | 08-275439 A | 10/1996 |
| JP | 10-108424 A | 4/1998 |
| JP | 2003-153481 A | 5/2003 |
| JP | 2005-253239 A | 9/2005 |
| JP | 2007-295666 A | 11/2007 |
| JP | 2008-005588 A | 1/2008 |
| JP | 2008-092714 A | 4/2008 |
| JP | 2009-110611 A | 5/2009 |
| JP | 2011-114892 A | 6/2011 |
| JP | 2012-005339 A | 1/2012 |

OTHER PUBLICATIONS

Tamaoka et al., "Motor and Disk Drive Apparatus", U.S. Appl. No. 13/564,900, filed Aug. 2, 2012.

Saeki, "Base Unit", U.S. Appl. No. 13/770,374, filed Feb. 19, 2013.

Fujinawa et al., "Base Member, Motor, and Disk Drive Apparatus", U.S. Appl. No. 13/770,395, filed Feb. 19, 2013.

Matsumoto et al., "Base Unit, Motor and Disk Drive Apparatus", U.S. Appl. No. 13/770,355, filed Feb. 19, 2013.

Saeki et al., "Stopper, Motor, and Disk Drive Apparatus", U.S. Appl. No. 13/767,194, filed Feb. 14, 2013.

Masumi et al., "Base Plate, Base Unit, Motor, Disk Drive Apparatus and Method of Manufacturing the Base Plate", U.S. Appl. No. 13/789,974, filed Mar. 8, 2013.

Tatsumi et al., "Base Plate, Base Unit, Motor and Disk Drive Apparatus", U.S. Appl. No. 13/788,140, filed Mar. 7, 2013.

Shiraishi et al., "Motor and Disk Drive Apparatus", U.S. Appl. No. 13/783,733 filed Mar. 4, 2013.

Sato et al., "Spindle Motor and Disk Drive Apparatus", U.S. Appl. No. 13/780,447, filed Feb. 28, 2013.

Matsumoto et al., "Spindle Motor and Disk Drive Apparatus", U.S. Appl. No. 13/792,448, filed Mar. 11, 2013.

Matsumoto et al., "Spindle Motor and Disk Drive Apparatus", U.S. Appl. No. 13/792,400, filed Mar. 11, 2013.

Matsumoto et al., "Base Unit, Motor and Disk Drive Apparatus", U.S. Appl. No. 13/785,194, filed Mar. 5, 2013.

Matsumoto et al., "Spindle Motor and Disk Drive Apparatus", U.S. Appl. No. 13/798,842, filed Mar. 13, 2013.

Sato et al., "Spindle Motor and Disk Drive Apparatus", U.S. Appl. No. 13/798,827, filed Mar. 13, 2013.

Ishino et al., "Motor and Disk Drive Apparatus", U.S. Appl. No. 13/794,864, filed Mar. 12, 2013.

* cited by examiner

DISK DRIVE SPINDLE MOTOR WITH WIRING SUBSTRATE HAVING EXTENSION PORTION PASSING THROUGH OPENING IN BASE

BACKGROUND OF THE INVENTION

1. Field of the Invention

The present invention relates to a spindle motor and a disk drive apparatus.

2. Description of the Related Art

Conventionally, a disk drive apparatus such as a hard disk drive apparatus or the like is equipped with a spindle motor for rotating a disk. The disk drive apparatus includes a disk, a housing, a stator, a FPC (Flexible Printed Circuit), and so forth. The housing includes a cover member, a base member, and so forth.

In recent years, the disk drive apparatus is required to become smaller in height and size. Particularly, in order to reduce the height of a 2.5-type disk drive apparatus having a thickness of 7 mm or less, which is used in small-size disk drive apparatuses, it is necessary to reduce the thickness of a housing or a motor arranged within the housing. In general, the motor includes a hub, a coil, a stator core, a wiring substrate, a base member, etc. When assembling the motor, these components are arranged to axially overlap with one another. For the sake of reducing the thickness of the motor, these components need to be made thin. However, if an attempt is made to reduce the overall height of the motor by reducing the turn number of the coils or the lamination thickness of the stator core, the magnetic fluxes generated in the stator during the operation of the motor will be reduced. In other words, the torque constant will be reduced. It is therefore impossible to obtain the torque required in rotating the disk attached to the hub.

In order to reduce the height of the motor, it is therefore necessary to pay attention to, among the components of the motor, the base member that has a large impact on the total axial dimension of the motor. However, if the base member is merely made thin, the rigidity of the base member will be reduced to a great extent. As a result, if a shock is applied from the outside to the base member, it is likely that the base member will be broken and that the disk arranged within the housing will be damaged.

Accordingly, a demand has existed for a structure capable of increasing the rigidity of the base member while reducing the overall height of the motor.

SUMMARY OF THE INVENTION

A spindle motor according to a preferred embodiment of the present invention includes a stationary unit, a rotary unit, and a bearing mechanism. The stationary unit includes a base member, a stator including a plurality of coils, and a wiring substrate electrically connected to the stator.

The base member includes a cylindrical tubular portion, a substantially annular first accommodation portion, an opening portion, a plurality of coil accommodation portions, a second accommodation portion, and at least one through-hole. The tubular portion extends axially about a center axis. The first accommodation portion is arranged on an upper surface of the base member and is depressed toward a lower surface of the base member so as to accommodate at least a portion of the stator. The opening portion is arranged in the first accommodation portion to extend through the base member. The coil accommodation portions are positioned in the first accommodation portion and are arranged around the tubular portion in a circumferential direction. The second accommodation portion is positioned in the first accommodation portion to extend in the circumferential direction and arranged to accommodate a portion of the wiring substrate. At least one through-hole is arranged in the second accommodation portion.

The wiring substrate includes an arc portion arranged in the second accommodation portion and an extension portion arranged on the lower surface of the base member through the opening portion.

A lead wire is led out from at least one of the coils and is connected to the arc portion by soldering within the through-hole.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

In the following description, the upper side in FIG. 1 along a center axis direction of a motor will be just referred to as "upper" and the lower side as "lower". The up-down direction is not intended to indicate the positional relationship or the orientation when the motor is installed within an actual device. The direction parallel or substantially parallel to the center axis will be referred to as "axial". The radial direction about the center axis will be just referred to as "radial". The circumferential direction about the center axis will be just referred to as "circumferential".

Figure 1:
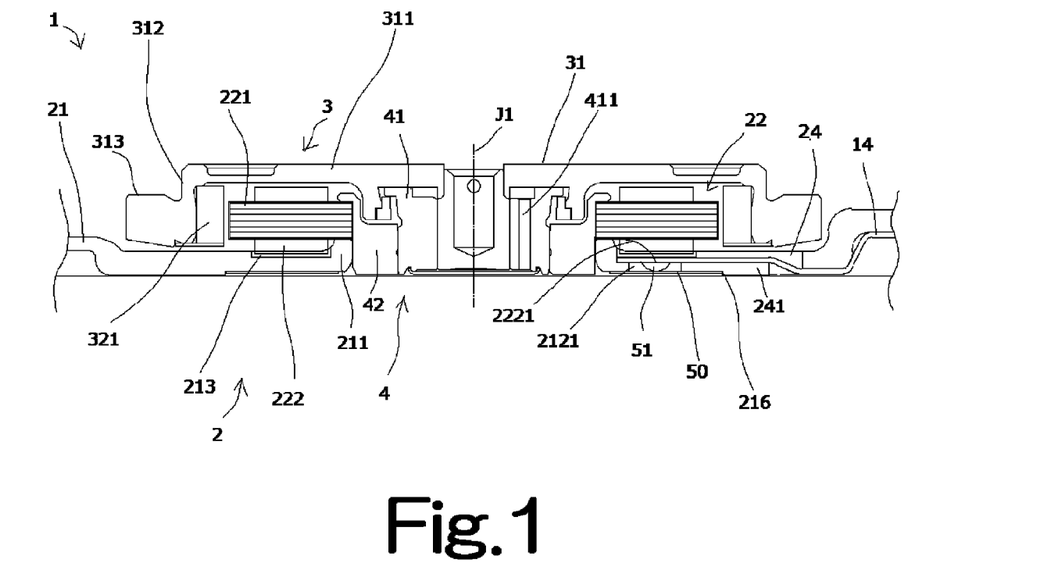
FIG. 1 is a sectional view showing a motor according to a preferred embodiment of the present invention.

FIG. 1 is a sectional view of a spindle motor 1 according to a preferred embodiment of the present invention. In the following description, the spindle motor 1 will be just referred to as "motor 1". The motor 1 is preferably used in a 2.5-type disk drive apparatus having a thickness of about 7 mm or less (e.g., a hard disk drive apparatus), for example. The disk drive apparatus preferably includes a motor 1, a housing (not shown), at least one disk (not shown), an access unit (not shown), a connector (not shown), and so forth. The disk is attached to the motor 1. The access unit performs at least one of information reading and writing tasks with respect to the disk. The housing preferably includes a base member 21 and a cover member. The base member 21 defines a portion of the housing in cooperation with the cover member (not shown).

As shown in FIG. 1, the motor 1 is preferably of an outer-rotor-type. In the present preferred embodiment, the motor 1 is preferably a three-phase motor having three phases, namely a U-phase, a V-phase and a W-phase. The motor 1 preferably includes a stationary unit 2 as a fixed assembly, a rotary unit 3 as a rotating assembly, and a fluidic dynamic-pressure bearing mechanism (hereinafter referred to as "bearing mechanism 4"). By virtue of the bearing mechanism 4, the rotary unit 3 is rotatably supported with respect to the stationary unit 2 to rotate about the center axis J1 of the motor 1.

The stationary unit 2 preferably includes a base member 21, a ring-shaped stator 22, and a wiring substrate 14. The base member 21 is a flat member. The base member 21 preferably includes a tubular portion 211 and an opening portion 24. The tubular portion 211 has a substantially cylindrical shape. The tubular portion 211 is arranged substantially at the center of the base member 21. The opening portion 24 axially extends through the base member 21. The stator 22 is arranged around the tubular portion 211. The stator 22 preferably includes a stator core 221 and coils 222. The coils 222 are arranged in the stator core 221. In the stator 22, a plurality of (three, in the present preferred embodiment) lead wires 2221 led out from the U, V and W phase coils are respectively connected to the wiring substrate 14 by soldering.

One preferred example of the wiring substrate 14 includes a flexible printed circuit board. The wiring substrate 14 lies on the upper surface of the base member 21 and extends from the rotary unit 3 toward the opening portion 24.

The stator core 221 preferably includes a core-back (not shown) and a plurality of teeth (not shown). The core-back preferably has a ring shape about the center axis J1. The teeth extend radially outward from the outer edge portion of the core-back. Each of the teeth preferably includes a winding portion and a tip end portion. A conductive wire is wound on the winding portion, thereby defining each of the coils 222. The tip end portion extends from the outer edge portion of the winding portion in the circumferential opposite directions.

Figure 10:
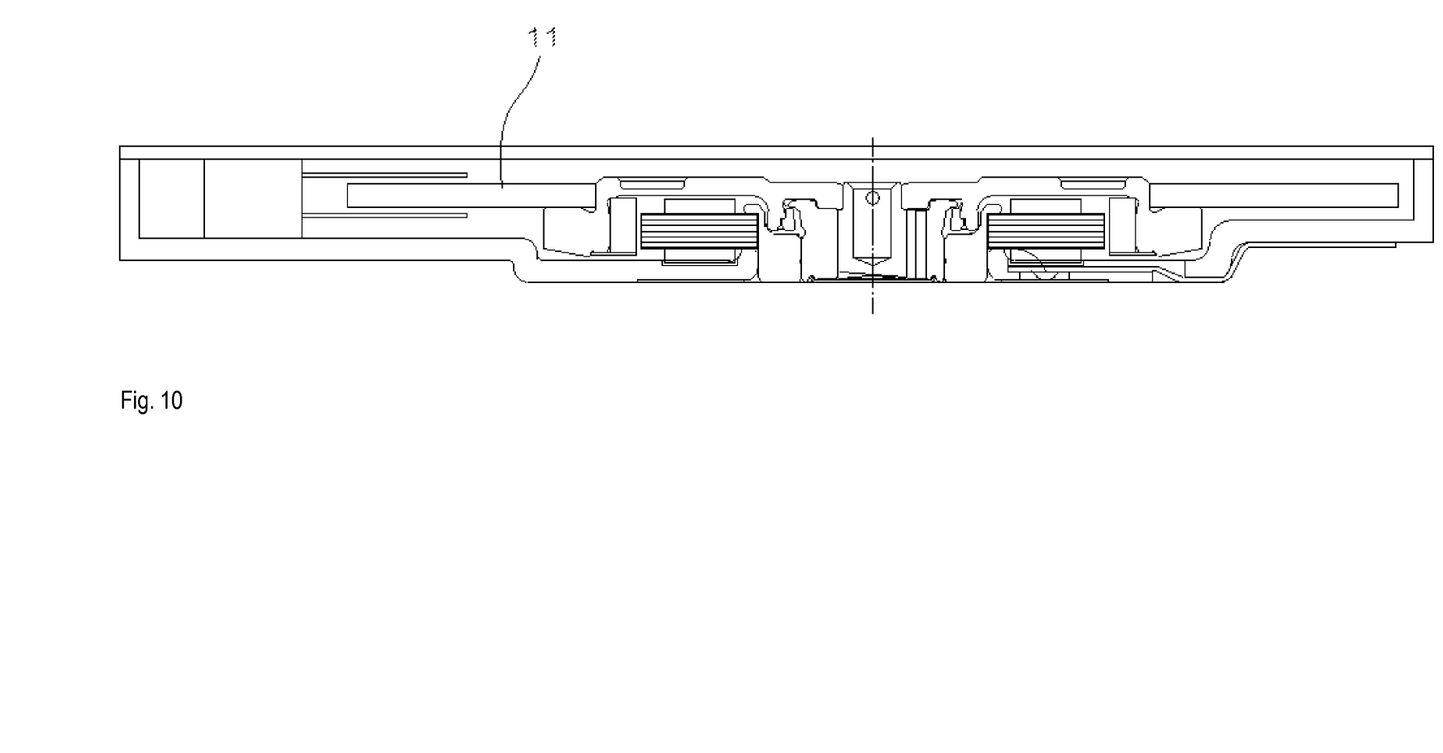
FIG. 10 is a sectional view of an assembled disk drive according to a preferred embodiment of the present invention.

As shown in FIG. 1, the rotary unit 3 preferably includes a rotor hub 31 and a rotor magnet 321. The rotor hub 31 preferably includes a hub body 311, a cylinder portion 312, and a ring-shaped disk placing portion 313. The cylinder portion 312 protrudes downward from the outer edge portion of the hub body 311. The disk placing portion 313 extends radially outward from the lower end of the cylinder portion 312. A disk 11 (shown in FIG. 10) is placed on the disk placing portion 313. The rotor magnet 321 has a ring shape about the center axis J1. The rotor magnet 321 is arranged inside the cylinder portion 312. The disk placing portion 313 is positioned radially outward of the lower portion of the rotor magnet 321. The rotor magnet 321 is arranged radially outward of the stator 22. The rotor magnet 321 is radially opposed to the stator 22. In the motor 1, torque is generated between the rotor magnet 321 and the stator 22 due to the interaction of the respective magnetic fluxes generated thereby.

As shown in FIG. 1, the bearing mechanism 4 is preferably a fluidic dynamic-pressure bearing. The bearing mechanism 4 preferably includes a lubricant, a sleeve 41, and a bush 42. The sleeve 41 is a substantially cylindrical member. The sleeve 41 is preferably defined by sintered metal formed by, for example, baking and solidifying metal powder. The sleeve 41 has a communication hole 411 extending through the sleeve 41 in the up-down direction. The sleeve 41 is preferably impregnated with a lubricant. The bush 42 has a substantially cylindrical shape and supports the sleeve 41 on the inner surface thereof. The stator core 221 is preferably fixed to the outer surface of the bush 42 by, for example, press-fitting or caulking. The bush is preferably fixed to the inner surface of the tubular portion 211 by, for example, press-fitting or the like.

Figure 2:
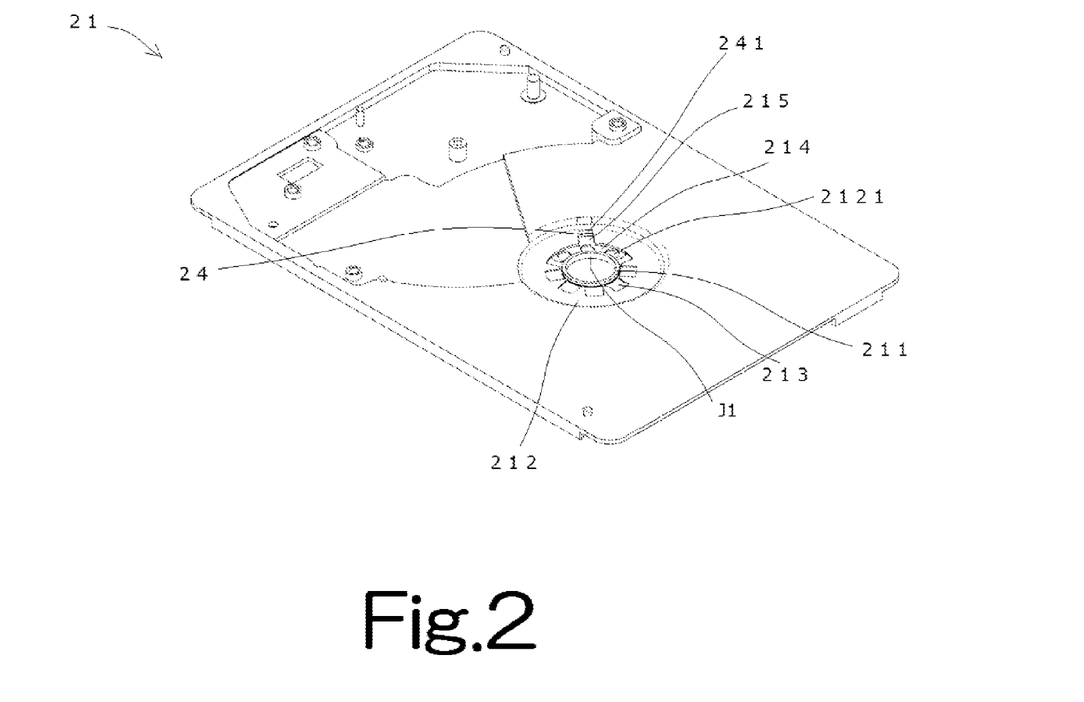
FIG. 2 is a top perspective view of a base member according to a preferred embodiment of the present invention.
Figure 3:
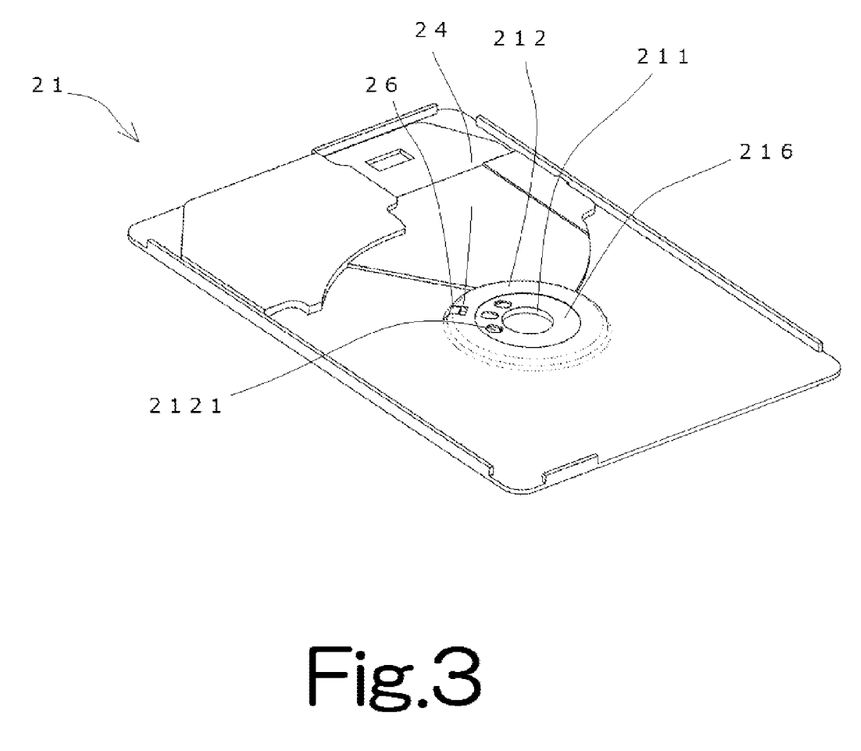
FIG. 3 is a bottom perspective view of the base member according to a preferred embodiment of the present invention.

FIG. 2 is a perspective view of the base member 21, depicting the upper surface side of the base member 21. FIG. 3 is a perspective view of the base member 21, depicting the lower surface side of the base member 21. As set forth above, the tubular portion 211 is arranged in the base member 21. A first accommodation portion 212 is arranged around the tubular portion 211. When seen axially, the first accommodation portion 212 preferably has a substantially annular shape. The first accommodation portion 212 is a portion arranged on the upper surface of the base member 21 and depressed toward the lower surface of the base member 21. At least a portion of the stator 22 can be accommodated in the first accommodation portion 212. A plurality of coil accommodation portions 213 is arranged within the first accommodation portion 212. The coil accommodation portions 213 are arranged around the tubular portion 211 at a regular interval along the circumferential direction. The coil accommodation portions 213 are not necessarily arranged at a regular interval and may be unevenly arranged. The coil accommodation portions 213 are portions defined on the upper surface of the base member 21 and depressed toward the lower surface of the base member 21. A second accommodation portion 214 is arranged inside the first accommodation portion 212. The second accommodation portion 214 is a portion defined on the upper surface of the base member 21 and depressed toward the lower surface (axial lower side) of the base member 21. The second accommodation portion 214 has a substantially arc-like shape when viewed axially. The second accommodation portion 214 extends in the circumferential direction along the outer surface of the tubular portion 211. A portion of the wiring substrate 14 can be accommodated within the second accommodation portion 214. As shown in FIG. 2, the second accommodation portion 214 is preferably positioned at the opposite side of the center axis J1 from at least one of the coil accommodation portions 213.

A third accommodation portion 215 is preferably arranged within the first accommodation portion 212. The third accommodation portion 215 is a portion depressed toward the lower surface of the base member 21. Within the first accommodation portion 212, the third accommodation portion 215 extends radially outward from the second accommodation portion 214. The opening portion 24 axially extending through the base member 21 is arranged radially outward of the third accommodation portion 215.

As shown in FIGS. 1, 2, and 3, a plurality of through-holes 2121 is arranged within the second accommodation portion 214. The respective through-holes 2121 axially extend through the base member 21. In the present preferred embodiment, three through-holes 2121 are arranged in the base member 21. The through-holes 2121 are arranged within the second accommodation portion 214 at a regular interval in the circumferential direction. The respective through-holes 2121 need not be necessarily arranged at a regular interval. At least one of the coil accommodation portions 213 is arranged within the second accommodation portion 214. The circumferential position of at least one of the through-holes 2121 is the same as the circumferential position of the third accommodation portion 215. In the second accommodation portion 214, at least one of the through-holes 2121 extends through at least one of the coil accommodation portions 213. The through-holes 2121 are provided in plural numbers. The number of the through-holes 2121 is smaller than the number of the coil accommodation portions 213.

A step portion 241 is arranged in the third accommodation portion 215 of the opening portion 24. As shown in FIG. 3, a groove 26 is arranged in the end portion of the opening portion 24 at the side of the lower surface of the base member 21. The groove 26 is axially opposed to the first accommodation portion 212. The groove 26 extends radially outward from the opening portion 24. The extension direction of the groove 26 is parallel or substantially parallel to the extension direction of the third accommodation portion 215.

Figure 4:
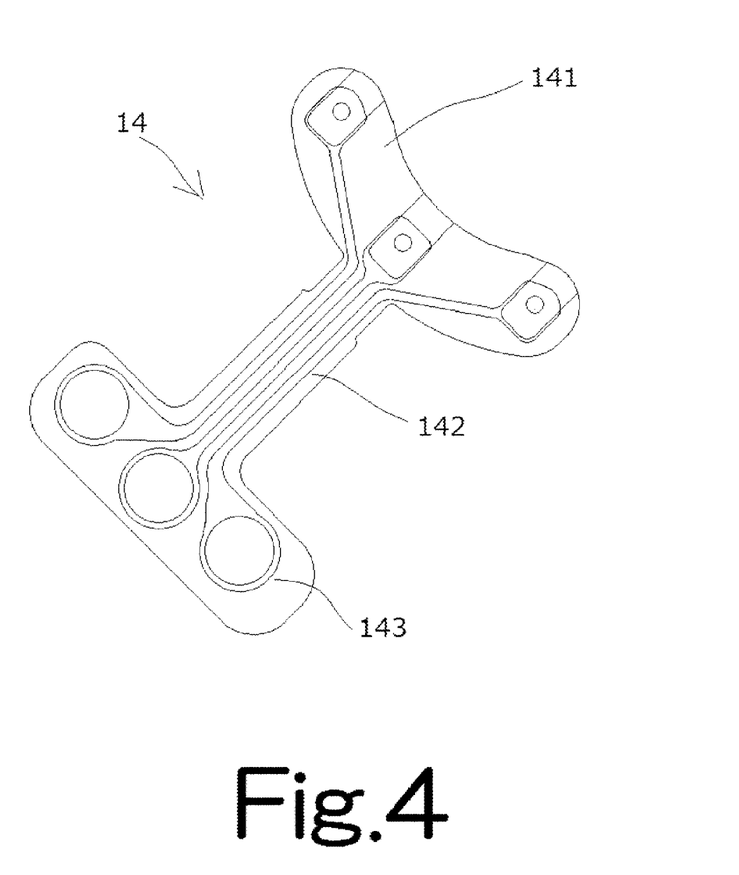
FIG. 4 is a plan view of a wiring substrate according to a preferred embodiment of the present invention.

FIG. 4 is a plan view of the wiring substrate 14. As shown in FIG. 4, the wiring substrate 14 preferably includes an arc portion 141 and an extension portion 142. When viewed axially, the arc portion 141 has a substantially arc shape corresponding to the second accommodation portion 214. When the motor 1 is assembled, the arc portion 141 is arranged within the second accommodation portion 214. The thickness of the arc portion 141 is preferably equal or substantially equal to the axial depth of the second accommodation portion 214 or smaller than the axial depth of the second accommodation portion 214. The extension portion 142 extends from the arc portion 141. The extension portion 142 preferably includes a power feeding portion 143 connected to an external power supply or the like. The thickness of the extension portion 142 is preferably about equal to the axial depth of the third accommodation portion 215 or smaller than the axial depth of the third accommodation portion 215. The thickness of the extension portion 142 is preferably equal or substantially equal to the axial depth of the groove 26 or smaller than the axial depth of the groove 26.

Figure 5:
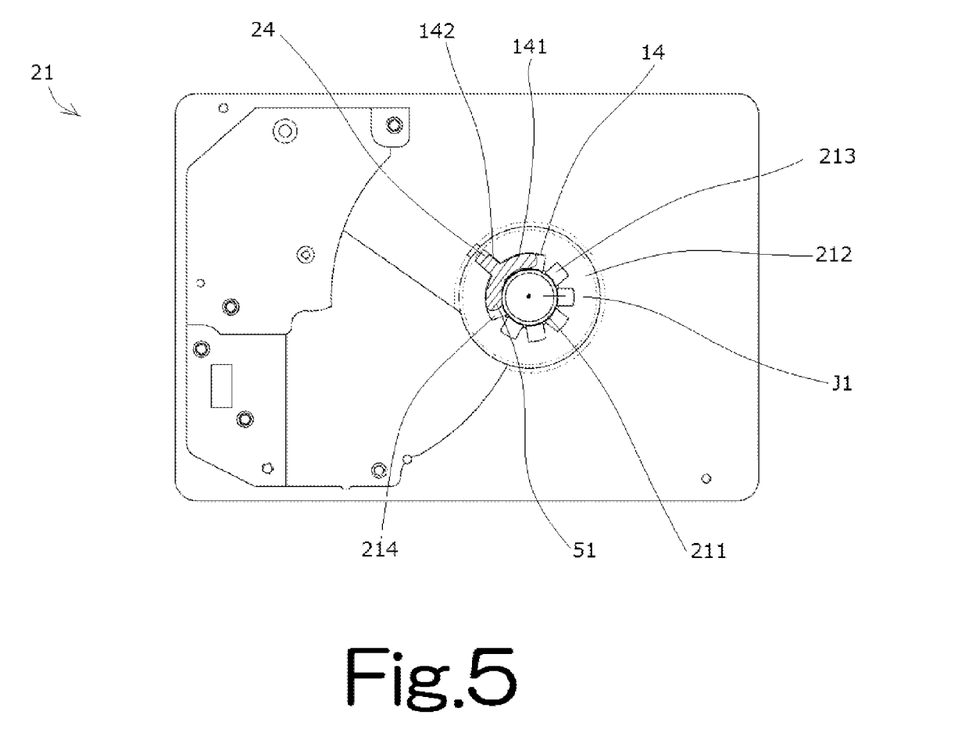
FIG. 5 is a plan view of the base member mounted with the wiring substrate according to a preferred embodiment of the present invention.

FIG. 5 is a plan view of the base member 21, showing a state that the wiring substrate 14 is arranged on the base member 21. If the wiring substrate 14 is arranged on the base member 21 as shown in FIGS. 1 and 5, the arc portion 141 is arranged within the second accommodation portion 214. The extension portion 142 is arranged within the third accommodation portion 215. The extension portion 142 is arranged on the lower surface of the base member 21 through the step portion 241 and the opening portion 24. At least a portion of the extension portion 142 arranged on the lower surface of the base member 21 is also arranged in the groove 26. In other words, the extension portion 142 extends from the upper surface of the base member 21 to the lower surface thereof through the second accommodation portion 214, the third accommodation portion 215, and the opening portion 24.

As stated above, the arc portion 141 preferably corresponds in shape to the second accommodation portion 214. For that reason, it is possible to prevent the arc portion 141 from circumferentially or radially protruding from the second accommodation portion 214. The thickness of the arc portion 141 is preferably equal or substantially equal to or smaller than the axial depth of the second accommodation portion 214. This makes it possible to prevent the arc portion 141 from axially protruding from the second accommodation portion 214. It is therefore possible to prevent the arc portion 141 from making contact with the stator 22 and to reduce the axial dimension of the motor 1.

As shown in FIGS. 1 and 5, the extension portion 142 is preferably accommodated within the third accommodation portion 215. For that reason, it is possible to prevent the extension portion 142 from protruding upward beyond the upper surface of the base member 21. Since the thickness of the extension portion 142 is equal to or smaller than the axial depth of the third accommodation portion 215, the extension portion 142 is prevented from axially protruding from the third accommodation portion 215. Thus, the extension portion 142 is prevented from making contact with the remaining portions of the motor 1. This preferably makes it possible to reduce the axial dimension of the motor 1. The thickness of the extension portion 142 is preferably equal or substantially equal to the axial depth of the groove 26 or smaller than the axial depth of the groove 26. For that reason, the extension portion 142 extending through the groove 26 does not protrude axially downward from the lower surface of the base member 21. The extension portion 142 is positioned within the thickness (i.e., the axial dimension) of the base member 21 having a flat shape. Thus, the overall axial dimension of the motor 1 can be reduced just as much as the thickness of the wiring substrate 14.

As shown in FIG. 3, a fourth accommodation portion 216 is preferably arranged on the lower surface of the base member 21 and is positioned at the axial opposite side from the first accommodation portion 212. The fourth accommodation portion 216 is a region depressed toward the lower surface of the base member 21. When viewed axially, the fourth accommodation portion 216 has a substantially annular shape about the center axis J1. The through-holes 2121 extending through the second accommodation portion 214 also extends through the fourth accommodation portion 216. The fourth accommodation portion 216 is arranged radially between the groove 26 and the opening of the tubular portion 211.

When a base unit is assembled by attaching the stator 22 and the like to the base member 21 as shown in FIG. 1, the fourth accommodation portion 216 is preferably sealed by a substantially flat seal member 50. The seal member 50 corresponds in shape to the fourth accommodation portion 216. The axial depth of the fourth accommodation portion 216 is equal or substantially about equal to the axial dimension of the seal member 50 or larger than the axial dimension of the seal member 50. When the fourth accommodation portion 216 is sealed by the seal member 50, it is preferably possible to prevent the seal member 50 from axially protruding from the fourth accommodation portion 216. This makes it possible to reduce the axial dimension of a motor 1 or a disk drive apparatus.

A plurality of lead wires 2221 led out from the coils 222 are connected to the arc portion 141 of the wiring substrate 14. In the present preferred embodiment, three lead wires 2221 are preferably connected to the arc portion 141 because the motor 1 preferably is a three-phase motor, for example. In the present preferred embodiment, the lead wires 2221 are preferably connected to the arc portion 141 by soldering. Alternatively, the lead wires 2221 may be connected to the arc portion 141 by any other desirable methods.

The connecting portions 51 of the arc portion 141 and the lead wires 2221 are respectively arranged within the through-holes 2121 of the second accommodation portion 214. The axial lower ends of the connecting portions 51 are positioned axially higher than the bottom of the fourth accommodation portion 216. For that reason, when the fourth accommodation portion 216 is sealed by the seal member 50, the connecting portions 51 are preferably prevented from making contact with the seal member 50. Similarly, the connecting portions 51 are prevented from protruding axially downward beyond the lower surface of the base member 21. Since the fourth accommodation portion 216 and the through-holes 2121 are respectively sealed by the seal member 50, dust or the like is prevented from entering the inside of the motor 1 through the fourth accommodation portion 216 or the through-holes 2121.

The base member 21 is preferably formed by, for example, a process including press working. First, a flat raw member is arranged within a progressive mold. A series of press workings is performed with respect to the raw member, thereby forming the base member 21 which includes the tubular portion 211, the first accommodation portion 212, the second accommodation portion 214, the third accommodation portion 215, the opening portion 24, the through-holes 2121, the coil accommodation portions 213, and so forth.

In the base member 21 subjected to the press workings, a cutting is preferably carried out on the inner surface of the tubular portion 211. Thus, the inner surface of the tubular portion 211 becomes smooth. This makes it possible to smoothly insert the sleeve 41 and to prevent deformation or clogging of the sleeve 41 during a press-fitting process of the sleeve 41. The cutting may be performed on the portions other than the tubular portion 211. For example, within the mold, portions other than the tubular portion 211, such as the entire upper and lower surfaces of the base member 21, the first accommodation portion 212, the second accommodation portion 214, the third accommodation portion 215, and the fourth accommodation portion 216, may be subjected to cutting as well as a press working.

In the base member 21 subjected to the press working, undercuts or burrs are formed in the peripheral edge of the opening of the tubular portion 211, the ends of the through-holes 2121, the opening portion 24, or the outer edge of the base member 21 by punching the raw member with the mold. In particular, a cutting may be performed with respect to the burrs formed by the press work. If the burrs are removed by the cutting, the peripheral edge of the tubular portion 211 and the end of the opening portion 24 preferably become smooth. Therefore, when assembling the base member 21, the components such as the stator 22 and the like can be attached with substantially no likelihood of damage. By performing the press working, an undercut is formed at the end of the tubular portion 211 on the lower surface of the base member 21.

A plating work is preferably performed with respect to the base member 21 which has been subjected to the press working and the cutting. For example, nickel-based metal is preferably used as the plating metal. By virtue of the plating work, the base member 21 is completely covered with a thin film of the plating metal. The thickness of the thin film may preferably be, e.g., from about 2 μm to about 10 μm. Accordingly, it is possible to prevent the base member 21 from being corroded by the lubricant of the bearing mechanism 4 or due to the external environment.

In the base member 21 subjected to the plating work, the thickness of the thin film at the end of the opening portion 24 is larger than the thickness of the thin film on the upper surface of the base member 21. Accordingly, when the wiring substrate 14 extends toward the upper surface and the lower surface of the base member 21 through the opening portion 24, it is preferably possible to prevent the wiring substrate 14 from being damaged by the end of the opening portion 24 or the step portion 241.

While a preferred embodiment of the present invention has been described above, the present invention can be modified in many other different forms.

For example, only one through-hole 2121 may be arranged in the second accommodation portion 214. In that case, the lead wires 2221 extending from the respective coils 222 are led to the single through-hole 2121 and are connected to the arc portion 141 by soldering or other desirable methods. Therefore, as compared with a case where a plurality of through-holes 2121 is provided, it is possible to increase the rigidity of the base member 21.

Even in case where a plurality of through-holes 2121 is arranged in the second accommodation portion 214, there may exist the through-hole 2121 to which the lead wires 2221 are led and the through-hole 2121 to which the lead wires 2221 are not led.

The second accommodation portion 214 may not have a recess shape but may alternatively be a through-hole axially extending through the base member 21. In that case, it is preferred that a brim portion be arranged in at least a portion of the inner surface of the second accommodation portion 214. The brim portion radially protrudes from the inner surface of the second accommodation portion 214. At least one brim portion may be arranged in the peripheral edge of the second accommodation portion 214. Also, a plurality of brim portions may be arranged in the peripheral edge of the second accommodation portion 214 if so desired. At least one brim portion may be arranged to surround the second accommodation portion 214. Therefore, when the wiring substrate 14 is arranged on the base member 21, the brim portions can axially support the arc portion 141 of the wiring substrate 14.

Figure 6:
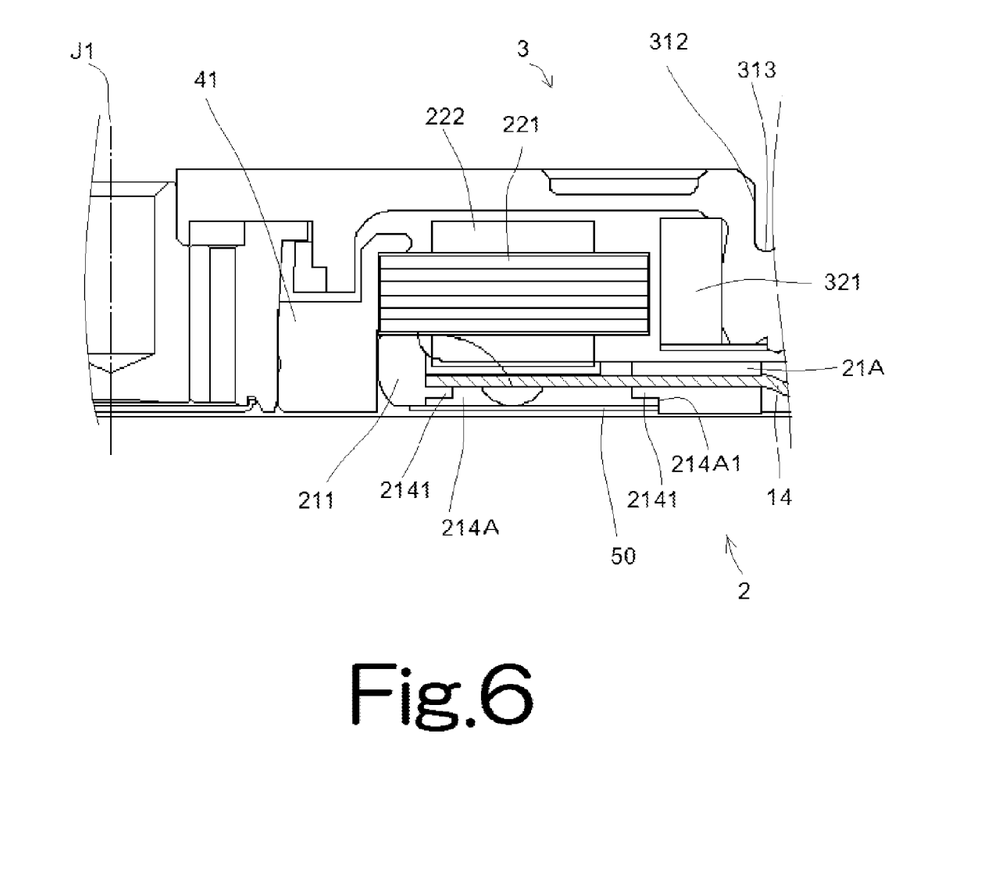
FIG. 6 is a partial sectional view of a motor according to a modified example of a preferred embodiment of the present invention.
Figure 7:
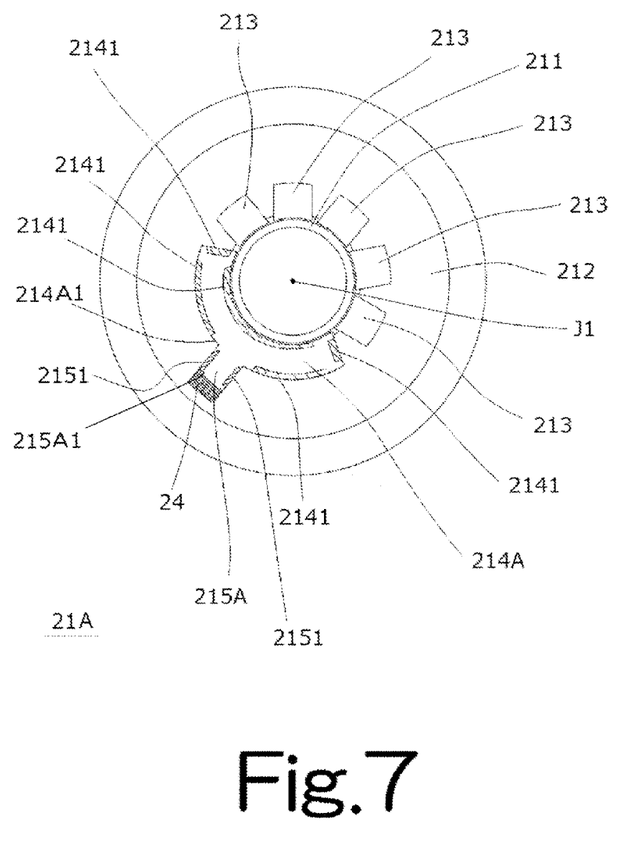
FIG. 7 is a partially enlarged plan view of a base member according to a modified example of a preferred embodiment of the present invention.

FIG. 6 is a partial section view of a motor in accordance with a modified example of a preferred embodiment of the present invention. FIG. 7 is a plan view of a base part 21A in accordance with a modified example of a preferred embodiment of the present invention, showing the tubular portion 211 and its vicinities. The same configuration as the aforementioned base member 21 will be designated by like reference symbols and will not be described herein below.

As shown in FIGS. 6 and 7, the base member 21A preferably includes a second through-hole portion 214A. The second through-hole portion 214A axially extends through the base member 21A. The second through-hole portion 214A is arranged radially outward of the tubular portion 211. When seen axially, the contour of the second through-hole portion 214A preferably has a substantially arc-like shape. The contour of the second through-hole portion 214A extends in the circumferential direction along the tubular portion 211.

As shown in FIGS. 6 and 7, at least one brim portion 2141 is arranged on the inner surface 214A1 of the second through-hole portion 214A. When the motor 1 is assembled, the brim portion 2141 axially supports the arc portion 141 of the wiring substrate 14. In this modified example, two brim portions 2141 are preferably respectively arranged in the radial outer region and the radial inner region of the inner surface 214A1. In other words, a pair of brim portions 2141 radially opposed to each other is arranged on the inner surface 214A1. The brim portions 2141 extend in the circumferential direction along the inner surface 214A1. When viewed axially, the contour of each of the brim portions 2141 extending in the circumferential direction has a substantially arc-like shape.

Brim portions 2141 are also preferably arranged in one circumferential end region and the other circumferential end region of the inner surface 214A1. In other words, at least one pair of brim portions 2141 opposed to each other in the circumferential direction is arranged on the inner surface 214A1. When viewed axially, the contour of the brim portions 2141 opposed to each other in the circumferential direction is rectangular or substantially rectangular.

The respective brim portions 2141 extend from the inner surface 214A1 in the direction perpendicular or substantially perpendicular to the center axis J1. In the example shown in FIG. 7, the brim portions 2141 extend in at least one of the radial direction and the circumferential direction.

At least one of the brim portions 2141 is opposed to at least one of the coils 222 in a spaced-apart relationship. In the example shown in FIG. 6, the brim portions 2141 are axially opposed to the coils 222. On the inner surface 214A1, the axial positions of the respective brim portions 2141 remain the same. Accordingly, when the wiring substrate 14 is arranged in the second through-hole portion 214A, the wiring substrate 14 extends parallel or substantially parallel to the direction perpendicular to the center axis J1.

The number, position and shape of the brim portions 2141 are not particularly limited. A plurality of brim portions 2141 may be arranged on the inner surface 214A1 of the second through-hole portion 214A in a spaced-apart relationship along the circumferential direction. When viewed axially, one brim portion 2141 may be arranged in a substantially ring-like shape along the inner surface 214A1 of the second through-hole portion 214A. The brim portions 2141 may have an identical shape or different shapes. The shape of the brim portions 2141 may be an arc shape, a polygonal shape, a circular shape, an elliptical shape or the combination thereof. However, the shape of the brim portions 2141 is not particularly limited thereto.

The second accommodation portion 214 may be the second through-hole portion 214A. The third accommodation portion 215 may be a through-hole portion axially extending through the base member 21A. In the example shown in FIG. 7, the base member 21A preferably includes a third through-hole portion 215A. At least one brim portion 2151 is arranged on the inner surface 215A1 of the third through-hole portion 215A. The brim portion 2151 protrudes from the inner surface 215A1 of the third through-hole portion 215A in the circumferential direction and extends in the radial direction. Referring to FIG. 7, two brim portions 2151 are circumferentially opposed to each other in a spaced-apart relationship. When viewed axially, the contour of the brim portions 2151 is rectangular or substantially rectangular. On the inner surface 215A1, the axial positions of the brim portions 2151 remain the same. Accordingly, when the wiring substrate 14 is arranged on the base member 21A, the extension portion 142 extends parallel or substantially parallel to the direction perpendicular to the center axis J1. In the example shown in FIG. 7, the second through-hole portion 214A is joined to the third through-hole portion 215A, thereby defining a single through-hole portion. The second through-hole portion 214A need not be necessarily joined to the third through-hole portion 215A.

The number, position and shape of the brim portions 2151 is not particularly limited. A plurality of brim portions 2151 may be arranged in at least one of one circumferential end region and the other circumferential end region of the inner surface 215A1 of the third through-hole portion 215A in a spaced-apart relationship. The brim portions 2151 arranged within the third through-hole portion 215A may be connected to the brim portions 2141 arranged within the second through-hole portion 214A. In that case, when viewed axially, the brim portions 2151 may be connected to the brim portions 2141 so as to define a substantially ring-like shape. At least a portion of the brim portions 2151 may be connected to at least a portion of the brim portions 2141. The brim portions 2151 may be arranged in a spaced-apart relationship with the brim portions 2141. The brim portions 2151 may have an identical shape or different shapes. The shape of the brim portions 2151 may be an arc shape, a polygonal shape, a circular shape, an elliptical shape, or the combination thereof. However, the shape of the brim portions 2151 is not particularly limited thereto. The shape of the brim portions 2151 may alternatively be identical with the shape of the brim portions 2141 or may differ from the shape of the brim portions 2141.

Referring to FIGS. 2 and 3, the circumferential width of the opening portion 24 is preferably equal or substantially equal to the circumferential width of the groove 26. However, the circumferential width of the opening portion 24 need not be necessarily equal to the circumferential width of the groove 26. The circumferential width of the opening portion 24 may differ from the circumferential width of the groove 26.

Figure 8:
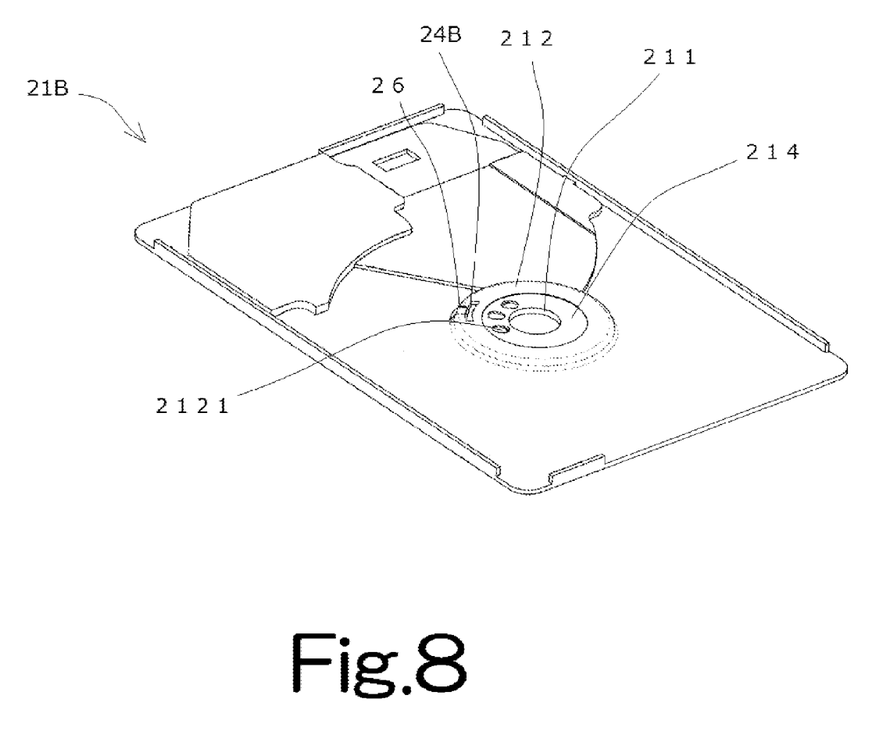
FIG. 8 is a perspective view of a base member according to another modified example of a preferred embodiment of the present invention.

FIG. 8 is a perspective view of a base member 21B according to another modified example of a preferred embodiment of the present invention, which is seen at the axial lower side. Referring to FIG. 8, an opening portion 24B extends in the circumferential direction. The circumferential width of the opening portion 24B is larger than the circumferential width of the groove 26. Accordingly, when assembling the motor 1, the extension portion 142 of the wiring substrate 14 can easily pass through the opening portion 24B. As a result, it is possible to reduce the time required in assembling the motor 1.

As shown in FIGS. 2 and 3, when viewed axially, the through-holes 2121 preferably have an identical contour. However, the through-holes 2121 may differ in contour from one another. The through-holes 2121 may differ in size and orientation from one another.

Figure 9:
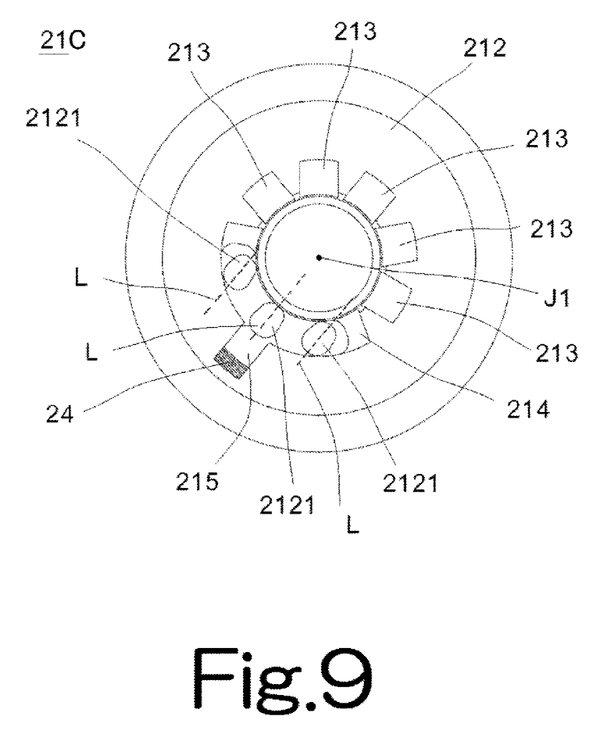
FIG. 9 is a partially enlarged plan view of a base member according to a further modified example of a preferred embodiment of the present invention.

FIG. 9 is a partially enlarged plan view of a base member 21C according to a further modified example of a preferred embodiment of the present invention. As shown in FIG. 9, when viewed axially, each of the through-holes 2121 has a region where the dimension in the direction perpendicular or substantially perpendicular to the center axis J1 becomes largest. In other words, when viewed axially, each of the through-holes 2121 has a contour extending in at least one direction. Referring to FIG. 9, when viewed axially, the direction in which the dimension of the contour of the through-holes 2121 becomes largest is the longitudinal direction. In the through-holes 2121, this direction will be referred to as "longitudinal direction". When viewed axially, the direction in which the through-holes 2121 face toward the tubular portion 211 is the longitudinal direction. In FIG. 9, the longitudinal directions of the through-holes 2121 are respectively indicated by broken lines L. When viewed axially, the longitudinal directions (indicated by the broken lines L) of the through-holes 2121 are parallel or substantially parallel to one another. Accordingly, when assembling the motor 1, the lead wires 2221 of the respective phases can be led out from the through-holes 2121 in a parallel or substantially parallel relationship with one another. As a result, it is possible to reduce the time required in assembling the motor 1.

The extension directions (longitudinal directions) of the contours of the through-holes 2121 may be identical with one another or may differ from one another. The through-holes 2121 may include a plurality of through-holes 2121 identical in the extension directions of the contours thereof. The through-holes 2121 may include a plurality of through-holes 2121 differing in the extension directions thereof. The longitudinal widths of the through-holes 2121 may be equal to one another or may differ from one another. The through-holes 2121 may include through-holes equal in the longitudinal width and through-holes differing in the longitudinal width. In the plane perpendicular or substantially perpendicular to the center axis J1, the widths of the through-holes 2121 in the direction perpendicular to the longitudinal direction may be equal to one another or may differ from one another. In the plane perpendicular or substantially perpendicular to the center axis J1, the widths of the through-holes 2121 in the longitudinal direction may be equal to, or may differ from, the widths of the through-holes 2121 in the direction perpendicular or substantially perpendicular to the longitudinal direction.

In the foregoing preferred embodiment, three-phase lead wires 2221 of U, V, and W phases preferably are all connected to the wiring substrate 14. In that case, a common wire is connected to the three lead wires 2221 at the side of the stator 22 but is not directly connected to the wiring substrate 14. Alternatively, the common wire may be connected to the wiring substrate 14 in place of the stator 22. In that case, the number of the through-holes 2121 arranged in the second accommodation portion 214 can be set to four, including the ones for the three lead wires 2221 and the one for the common wire. As long as short circuit or mutual contact is prevented, one of the common wire and the three lead wires 2221 may be arranged within each of the through-holes 2121 together with the remaining lead wires 2221. This configuration makes it possible to reduce the number of the through-holes 2121. As a result, it is possible to prevent the reduction of rigidity of the base member 21 otherwise caused by the arrangement of the through-holes 2121.

The motor 1 of the foregoing preferred embodiments preferably is a three-phase motor. However, the number of phases of the motor 1 need not be particularly limited. For example, it may be possible to provide a single-phase motor or a multiple-phase motor such as a five-phase motor or a seven-phase motor. In that case, the number of the through-holes 2121 arranged in the second accommodation portion 214 may be changed in conformity with the number of the lead wires 2221 or the treatment method of the common wire.

Preferred embodiments of the present invention can be used in a motor for a disk drive apparatus or in a motor for other applications than the disk drive apparatus.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A spindle motor, comprising:
    a stationary unit;
    a rotary unit; and
    a bearing mechanism; wherein
    the stationary unit includes a base member, a stator including a plurality of coils, and a wiring substrate electrically connected to the stator;
    the base member includes a cylindrical tubular portion axially extending about a center axis, a substantially annular first accommodation portion arranged on an upper surface of the base member and depressed toward a lower surface of the base member so as to accommodate at least a portion of the stator, an opening portion arranged in the first accommodation portion to extend through the base member, a plurality of coil accommodation portions positioned in the first accommodation portion and arranged around the tubular portion in a circumferential direction, a second accommodation portion positioned in the first accommodation portion to extend in the circumferential direction and arranged to accommodate a portion of the wiring substrate, and at least one through-hole arranged in the second accommodation portion;
    the wiring substrate includes an arc portion arranged in the second accommodation portion and an extension portion arranged on the lower surface of the base member through the opening portion; and
    at least one lead wire is led out from at least one of the coils and soldered to the arc portion within the at least one through-hole.

2. The spindle motor of claim 1, wherein the coil accommodation portions are arranged on the upper surface of the base member and depressed toward the lower surface of the base member.

3. The spindle motor of claim 1, wherein the coil accommodation portions are arranged at a regular interval in the circumferential direction.

4. The spindle motor of claim 1, wherein at least one of the coil accommodation portions is arranged in the second accommodation portion.

5. The spindle motor of claim 4, wherein the at least one through-hole extends through the at least one of the coil accommodation portions.

6. The spindle motor of claim 1, wherein the second accommodation portion is arranged on the upper surface of the base member and depressed toward the lower surface of the base member.

7. The spindle motor of claim 6, wherein the second accommodation portion has a substantially arc-shaped configuration.

8. The spindle motor of claim 6, wherein the second accommodation portion is positioned at the opposite side of the center axis from at least one of the coil accommodation portions.

9. The spindle motor of claim 6, wherein the at least one through-hole includes three through-holes arranged in the second accommodation portion.

10. The spindle motor of claim 9, wherein the three through-holes are arranged at a regular interval in the circumferential direction.

11. The spindle motor of claim 1, wherein the at least one through-hole includes a plurality of through-holes smaller in number than the coil accommodation portions.

12. The spindle motor of claim 1, wherein the at least one through-hole includes a plurality of through-holes, each of which has a contour extending in at least one direction when viewed axially.

13. The spindle motor of claim 1, wherein the at least one through-hole includes three through-holes, the at least one lead wire including three lead wires, each of which is arranged in a respective one of the three through-holes.

14. The spindle motor of claim 1, wherein the base member further includes a third accommodation portion arranged in the first accommodation portion to extend radially outward from the second accommodation portion, the extension portion being arranged in the third accommodation portion.

15. The spindle motor of claim 14, wherein the extension portion extends from the upper surface of the base member to the lower surface of the base member through the second accommodation portion, the third accommodation portion and the opening portion.

16. The spindle motor of claim 14, wherein the extension portion has a thickness equal to or smaller than an axial depth of the third accommodation portion.

17. The spindle motor of claim 14, wherein the opening portion is arranged in the third accommodation portion.

18. The spindle motor of claim 1, wherein the base member further includes a step portion arranged in the opening portion, the extension portion being arranged on the lower surface of the base member through the step portion and the opening portion.

19. The spindle motor of claim 1, wherein the base member further includes a groove arranged on the lower surface of the base member to extend radially outward from the opening portion, at least a portion of the extension portion being arranged in the groove.

20. The spindle motor of claim 19, wherein the extension portion has a thickness equal to or smaller than an axial depth of the groove.

21. The spindle motor of claim 1, wherein the base member further includes a fourth accommodation portion arranged on the lower surface of the base member and depressed toward the upper surface of the base member, the at least one through-hole extending through the fourth accommodation portion.

22. The spindle motor of claim 21, wherein the fourth accommodation portion is sealed by a substantially flat seal member.

23. The spindle motor of claim 22, wherein the fourth accommodation portion has an axial depth equal to or larger than an axial dimension of the seal member.

24. The spindle motor of claim 21, wherein the arc portion and the at least one lead wire are connected to each other in a connecting portion, the connecting portion being arranged in the at least one through-hole, the connecting portion including an axial lower region positioned axially inward of a bottom of the fourth accommodation portion.

25. The spindle motor of claim 1, wherein the arc portion has a thickness equal to or smaller than an axial depth of the second accommodation portion.

26. The spindle motor of claim 1, wherein the extension portion includes a power feeding portion connected to an external power supply.

27. The spindle motor of claim 1, wherein the base member further includes a second through-hole portion arranged radially outward of the tubular portion to extend through the base member.

28. The spindle motor of claim 27, wherein the base member further includes a brim portion arranged on an inner surface defining the second through-hole portion.

29. The spindle motor of claim 1, wherein the base member is formed by a process including press working.

30. A 2.5-type disk drive apparatus having a thickness of about 7 mm or less, comprising:
   the spindle motor of claim 1;
   a housing including at least a cover member and the base member; and
   at least one disk held in the rotary unit.

* * * * *